UNITED STATES PATENT OFFICE.

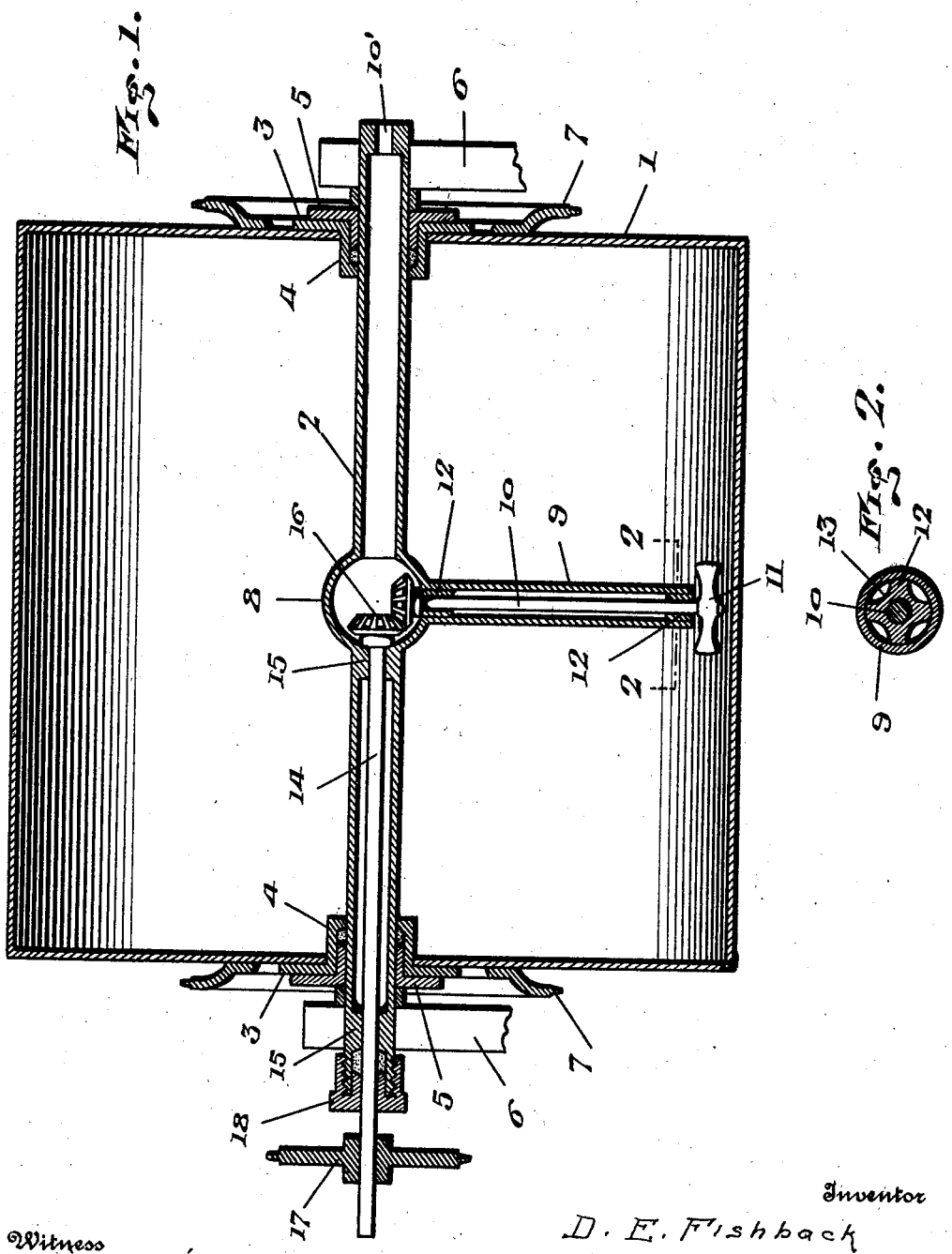

DAVIS E. FISHBACK, OF ORLANDO, FLORIDA.

AGITATOR.

1,318,654. Specification of Letters Patent. Patented Oct. 14, 1919.

Application filed August 11, 1919. Serial No. 316,690.

*To all whom it may concern:*

Be it known that I, DAVIS E. FISHBACK, a citizen of the United States, residing at Orlando, in the county of Orange and State of Florida, have invented certain new and useful Improvements in Agitators; and I do hereby declare the following to be a full, clear, and exact description of the invention, such as will enable others skilled in the art to which it appertains to make and use the same.

The present invention relates to an agitator for use within a spray tank, and aims to provide novel and improved means for agitating the spraying solution or other liquid within the tank, to prevent sediment accumulating at the bottom of the tank from which the solution is withdrawn.

A further object is the provision of a roller or drum type tank, the axle of which is provided with means for the withdrawal of the solution from the bottom of the tank, and with means for agitating the solution to prevent sediment from accumulating at the bottom, which if it occurs results in an overstrong solution being withdrawn, which will burn or injure the vegetation sprayed.

By way of explanation, it may be stated that the roller or drum type of the spraying tank is used for agitating the solution by the rotation thereof, such tank being sometimes used as a roller or wheel for a frame carrying the engine, pump, and other equipment, so that the machine in being moved from one tree to another, will cause the tank to rotate for agitating the solution. However, it frequently happens that the machine while at rest will permit sediment to accumulate on the bottom of the tank during the spraying operation, so that the spraying solution will become too strong, so as to burn or injure the vegetation. The present invention provides means in such a tank for agitating the solution so as to keep the ingredients thereof thoroughly mixed at all times, and to especially make the solution at the point where the solution is withdrawn.

With the foregoing and other objects in view, which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawing, wherein:—

Figure 1 is a vertical section of a roller or drum type of tank showing the improvements embodied therein.

Fig. 2 is an enlarged sectional detail taken on the line 2—2 of Fig. 1.

The tank 1, as shown, is in the form of a roller or drum having a horizontal axis, and rotatable upon a horizontal tubular axle 2. Hub plates 3 secured centrally to the ends of the tank have stuffing boxes 4 extending inwardly and holding packing and also receiving glands 5, to prevent leakage. The axle 2 may be supported by the frame 6, or said frame may be supported by the axle, when the tank 1 is used as a roller or wheel of a machine that can be propelled or moved from place to place, the rotation of the tank being used for agitating the spraying solution therein. Sprocket wheels 7 can be secured to the ends of the tank for rotating the tank for the purpose of propelling the machine over the ground, or for rotating the tank to agitate the solution.

The axle 2 is used for the withdrawal of the solution from the tank, being provided between its ends with an enlargement 8 from which an eduction pipe 9 extends to a point near the bottom of the tank. One end of the axle 2 is provided with an outlet 10' for the connection of a hose or piping to withdraw the solution, which passes upwardly through the pipe 9 into the enlargement 8 of the axle, and thence through one half of the axle to the outlet port 10'. The axle is non-rotatable, so that a pipe 9 will always extend to the bottom.

In order to keep the solution agitated, especially at the lower end of the pipe 9, a vertical shaft 10 is disposed within the pipe 9, and an agitating propeller 11 is secured to the lower end of the shaft below said pipe and above the bottom of the tank, so that the shaft in being rotated will cause the propeller or agitator to thoroughly agitate the solution and prevent the accumulation of sediment on the bottom of the tank below the pipe 9. This shaft 10 is journaled within bearings 12 secured within said pipe at the upper and lower ends thereof, and said bearings have slots or passages 13 for the flow of the solution past the bearings. The propeller or agitator is driven by means of a horizontal drive shaft 14 extending longitudinally within the axle 2 opposite to the fluid-outlet portion thereof, and bearings 15 are provided within the axle in which said shaft is journaled. The inner end of the shaft 14 and upper end of the shaft 10 are connected by means of bevel gears 16 located within the enlargement, and a sprocket wheel 17 or other means is connected to the outer terminal of the shaft 14 for applying power thereto for rotating the propeller. A packing 18 of any suitable kind is provided on the respective end of the axle 2 around the shaft 14 to prevent leakage.

With the present arrangement the axle is provided with means for withdrawing the solution from the bottom of the tank, and is also provided with means for agitating the solution at the bottom of the tank to prevent the accumulation of sediment, and to assure of a uniform mixture of the solution where it is withdrawn from the tank. With the present device, there is no danger of the solution becoming too strong by the precipitation of sediment should the drum or tank remain stationary and even during the rotation of the drum if not sufficiently fast to prevent precipitation.

Having thus described the invention, what is claimed as new is:—

1. The combination of a tank, an eduction pipe depending to the bottom thereof, and an agitator working within the tank near the lower end of and separate from said pipe.

2. The combination of a tank, an eduction pipe depending therein to the bottom thereof, and an agitating propeller working within the tank below and separate from said pipe.

3. The combination of a tank, an eduction pipe depending therein, a shaft extending through said pipe, and an agitator carried by said shaft below said pipe.

4. The combination of a drum tank, a horizontal axle for said tank, an eduction pipe depending from said axle to the bottom of the tank, and an agitator within the tank working near the lower end of said pipe to prevent the accumulation of sediment on the bottom of the tank.

5. The combination of a drum tank, a horizontal axle therefor, an eduction pipe depending from said axle to the bottom of the tank, and an agitator working below said pipe.

6. The combination of a drum tank, an axle therefor, an eduction pipe depending from said axle to the bottom of the tank, said axle having a passage communicating with said pipe for the withdrawal of liquid from the tank, an agitator working at the lower end of said pipe, and actuating means for the agitator carried by said axle.

7. The combination of a drum tank, an axle therefor, an eduction pipe depending from the axle to the bottom of the tank, the axle having a passage communicating with said pipe for the withdrawal of liquid from the tank, a shaft journaled in said pipe, an agitator carried by said shaft below said pipe, and a driving shaft mounted in said axle and connected to the aforesaid shaft.

In testimony whereof I have signed my name to this specification.

DAVIS E. FISHBACK.

Copies of this patent may be obtained for five cents each, by addressing the "Commissioner of Patents, Washington, D. C."